US006290810B1

(12) United States Patent
Yovichin et al.

(10) Patent No.: US 6,290,810 B1
(45) Date of Patent: *Sep. 18, 2001

(54) MOLD FOR CURING PRECURED TREADS TO TIRE CASINGS

(75) Inventors: Albert James Yovichin, Copley; Thomas Andrew Laurich, Tallmadge, both of OH (US)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,560

(22) PCT Filed: Aug. 16, 1996

(86) PCT No.: PCT/US96/13741

§ 371 Date: Oct. 27, 1998

§ 102(e) Date: Oct. 27, 1998

(87) PCT Pub. No.: WO98/07562

PCT Pub. Date: Feb. 26, 1998

Related U.S. Application Data

(63) Continuation-in-part of application No. 08/962,142, filed on Oct. 31, 1997, now Pat. No. 6,089,290, which is a continuation of application No. 08/642,377, filed on May 3, 1996, now abandoned, which is a division of application No. 08/497,709, filed on Jun. 30, 1995, now Pat. No. 5,536,348.

(51) Int. Cl.[7] .................................................. B29C 33/14
(52) U.S. Cl. ................................... 156/394.1; 152/209.6; 156/129; 425/35; 425/43
(58) Field of Search .............................. 156/96, 127, 129, 156/394.1, 909; 425/43, 35, 36, 17, 812, 46, 28.1; 152/209.6

(56) References Cited

U.S. PATENT DOCUMENTS

| 1,361,764 | 12/1920 | Hibbs . | |
| 3,057,011 | * 10/1962 | Knox | ...................................... 425/46 |

(List continued on next page.)

FOREIGN PATENT DOCUMENTS

| 2711118 | 9/1978 | (DE) . |
| 0505814 | 9/1992 | (EP) . |

Primary Examiner—Geoffrey L. Knable
(74) Attorney, Agent, or Firm—David L King

(57) ABSTRACT

A mold 20 for curing a precured tread 10 to a tire casing 100 is disclosed. The mold 20 has a first annular portion 24, a second annular portion 44, a pair of annular portions 12,14, and an inflatable bladder 23 for insertion into the casing 100 when enclosed in the cavity 53 of the closed mold 20. The first annular portion 24 has a sidewall supporting member 27, the sidewall supporting member 27 having a bead forming end 29, and a tread supporting member 28 integrally attached and generally normal to the sidewall support member 27. The tread supporting member 28 has a smooth axially contoured annular surface for contacting the radially outer surface of the precured tread 10 and a first end 50 in proximity to the tread lateral end 48 of the second annular portion 44. The second annular portion 44 has a sidewall supporting member 47 and tread lateral end supporting member 48 the second portion 44 having a first end 50 and a second end 52. The first end 50 is adjacent to the tread supporting member 48 of the portion 44. The first end 50 is aligned with the first end 51 of the first annular portion 24 when the mold 20 is closed thus forming a cavity 53 for the precured tread 10 and casing 100. The preferred mold 20 has the first end 51 of the tread supporting member 28 located at or near the lateral end 50 located adjacent relative to the tread support member 48.

4 Claims, 8 Drawing Sheets

U.S. PATENT DOCUMENTS

| | | |
|---|---|---|
| 3,216,062 | 11/1965 | Shaver et al. . |
| 4,111,732 | 9/1978 | MacMillian . |
| 4,229,245 | 10/1980 | Pringle . |
| 4,562,031 | 12/1985 | Rossi .................................... 264/255 |
| 4,883,415 | 11/1989 | Solvadori ............................... 425/47 |
| 5,141,424 * | 8/1992 | Christof ................................ 425/46 |
| 5,201,975 * | 4/1993 | Holroyd et al. ..................... 156/124 |
| 5,536,348 | 7/1996 | Chlebina et al. . |

* cited by examiner

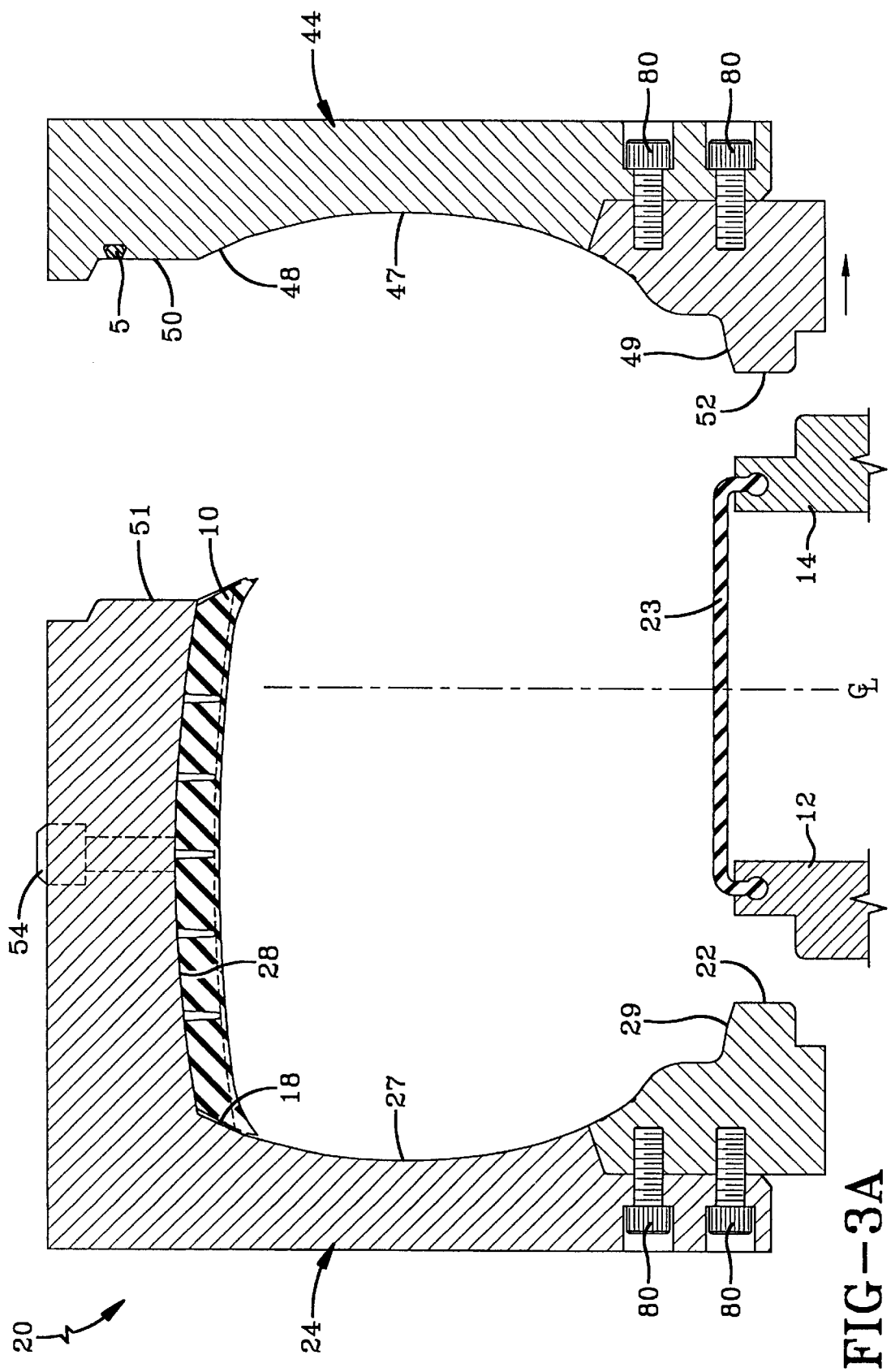

MOLD FOR CURING PRECURED TREADS TO TIRE CASINGS

This application is a U.S. National Application under 35 U.S.C. §371 of International Patent PCT/US96/13741 filed Aug. 16, 1996, entitled MOLD FOR CURING PRECURED TREADS TO TIRE CASINGS, and a continuation-in-part of U.S. application Ser. No. 08/962,142 filed Oct. 31, 1997 now U.S. Pat. No. 6,089,290, which is a FWC of a divisional application Ser. No. 08/642,377, filed May 3, 1996, now abandoned, of parent application Ser. No. 08/497,709, filed Jun. 30, 1995, now U.S. Pat. No. 5,536,348 issued Jul. 16, 1996.

TECHNICAL FIELD

This invention relates to a mold for curing a precured tread to a tire casing.

BACKGROUND ART

Historically the use of precured treads was limited to retreaded tires exclusively. Tire casings are designed to survive several times longer than the tread. This is particularly true of truck tires and low aspect ratio passenger tires.

The Goodyear Tire & Rubber Company in the late 1980's introduced the unicircle precured injected molded tread. This precured tread is disclosed in European Patent publication 0-464-660A1. This annular or arcutely shaped tread had short annular wings radially inwardly extending. The wings were flexible and adapted to accommodate casings of various axial widths. This tread introduced high pressure injection molded rubber compounds having excellent wear and rolling resistance properties. Materials used in tread rubber compounds have also been improved making it feasible to transfer compression high quality treads for tires which can also achieve excellent wear and performance characteristics.

Later development efforts were concentrated on improved adhesion of the tread to the casing and in particular better ways of adhering the wing edge to the casing. On May 24, 1994, U.S. Pat. No. 5,313,745 issued to Carl L. Mace, Jr., et al. This patent related to a tread edge grinding method which effectively created a circumferential edge enabling the cushion gum rubber to migrate over the chamfer effectively locking the annular wing of the precured tread to the cushion gum in the casing. The advancement in the overall adhesion properties of the tread to casing bond coupled with the ability to meet or surpass the performance of the conventional molded new tires means that it is now feasible for new tires to be made using precured treads. One aspect of the present invention describes an improved mold for facilitating the assembling of a precured tread to a previously unvulcanized casing.

DESCRIPTION OF THE INVENTION

Summary of the Invention A tire and a mold 20 for curing a precured tread 10 to a tire casing 100 is disclosed. The tire has casing and a precured tread, the precured tread 10 has a pair of lateral ends and a radially outer tread surface having a diameter and contour built to the same diameter and contour as the mold. The mold 20 has a first annular portion 24 and a second annular portion 44. The first annular portion 24 has a sidewall supporting member 27, the sidewall supporting member 27 has a bead forming end 29 and tread lateral end support 18. The first annular portion 24 further has a tread supporting member 28 integrally attached and generally oriented normal to the sidewall supporting member 27 at the location of the tread lateral end support 18 of the sidewall supporting member 27. The tread supporting member 28 has a smooth axially contoured annular surface for contacting the radially outer surface of the precured tread 10 and a first end 51. The second annular portion 44 has a sidewall member 47 and tread lateral end supporting member 48.

The second annular portion 44 has a first end 50 and a second end 52. The first end 50 is adjacent to the tread lateral end supporting member 48. The first end 50 is also aligned with the first end 51 of the first annular portion 44 when the mold 20 is closed forming a cavity 53 for the precured tread 10 and casing 100 assembly 200 and the second end 52 is located at a bead forming end 49 of the second annular portion 44.

The mold 20 also includes a pair of movable annular portions, the annular portions 12,14 being adapted to removably engage the bead forming ends 29,49 of the first and second annular portions 24,44. The mold 20 further includes an inflatable bladder 23 for insertion into the casing 100 when the casing 100 is enclosed in the cavity 53 of the mold 20. In the preferred embodiment the first end 51 of the tread supporting member 28 of the first annular portion 24 is located at the tread lateral end 48 supporting member located adjacent relative to the sidewall support member 47 of the second annular 44. Preferably the tread supporting member 28 has a port 54 for venting or pressurizing void spaces between the tread 10 and the smooth annular surface of the tread supporting member 28 of the first annular 24.

Definitions. "Axial" and "axially" means the lines or directions that are parallel to the axis of rotation of the tire.

"Buffed" means a procedure whereby the surface of an elastomeric tread or casing is roughened. The roughening removes oxidized material and permits better bonding.

"Casing" means the carcass, belt structure, beads, sidewalls, and all other components of the tire including a layer of unvulcanized rubber to facilitate the assembly of the tread, the tread and undertread being excluded. The casing may be new, unvulcanized rubber or previously vulcanized rubber to be fitted with a new precured tread.

"Equatorial Plane (EP)" means the plane perpendicular to the tire's axis of rotation and passing through the center of its tread.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load.

"Pre-cured component" means a component at least partially vulcanized prior to assembly with other components.

"Radial" and "radially" mean directions radially toward or away from the axis of rotation of the tire.

"Replacement tread" as used herein refers to a premolded and precured tread.

"Retreading" means the procedure of refurbishing a tread worn tire be removing the old tread and replacing it with a precured tread or a "hot capped" tread.

"Tread" means a molded rubber component which, when bonded to a tire casing, includes that portion of the tire which comes into contact with the road when the tire is normally inflated and under normal load.

"Wings" means the radial inward extension of the tread located at axial extremes of the tread, the inner surface of the wing being an extension of the casing contacting surface of the tread.

BRIEF DESCRIPTION OF DRAWINGS

FIG. 3A shows the cross-section view of the mold taken from FIG. 2, the mold being open with the tread inserted therein.

DETAILED DESCRIPTION OF THE INVENTION

Figure 1:
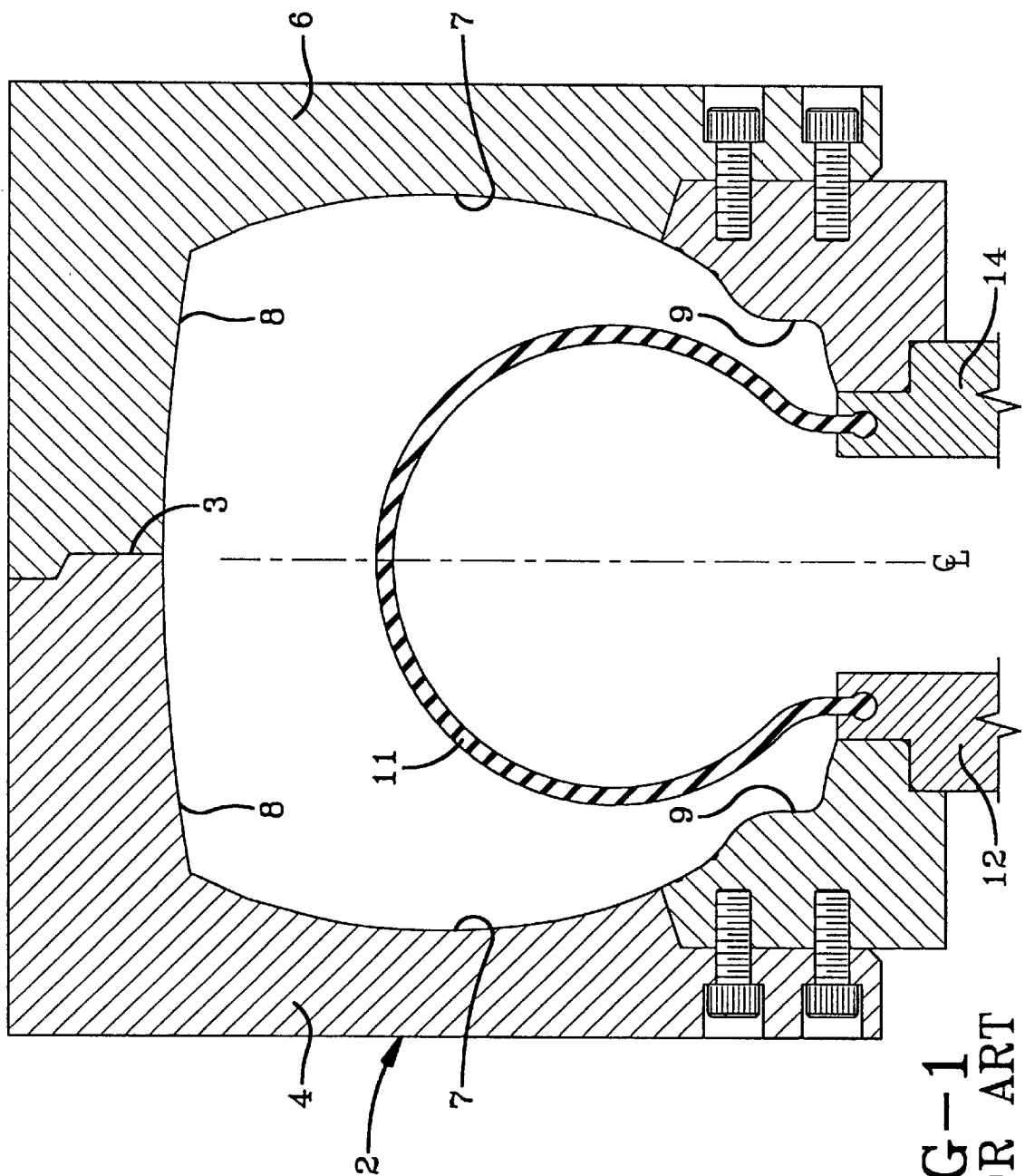
FIG. 1 is a cross-sectional view of a prior art two-piece mold.

With reference to FIG. 1 a cross-sectional view of a conventional two-piece tire mold 2 is shown. This prior art tire mold 2 has a first and second portion 4,6 both the first and second portion 4,6 have a sidewall supporting member 7 and a tread supporting member 8. Two portions 4,6 are split approximately along the centerline $C_L$ of the mold 2. Additionally, this prior art mold 2 will include a pair of annular bead forming rings 9 and an inflation bladder 11 for pressing the casing and tread assembly against the mold 2 when the mold closes and is curing the tire.

The parting line 3 of a typical two-piece mold is placed at or close to the center as shown in FIG. 1. In order to use such a mold with a precured tread, the overall tread diameter must be somewhat less than the mold so that when the mold closes the top half of the mold does not catch the tread and deform it. However, as the casing shapes into the smaller tread as the curing bladder expands, it does not always register correctly. This causes the cured tire to be deformed. Using a smaller OD tread requires that the casing must also be built smaller. This means that the unvulcanized casing will have to deform more to reach its final shape in the molding process.

Figure 2:
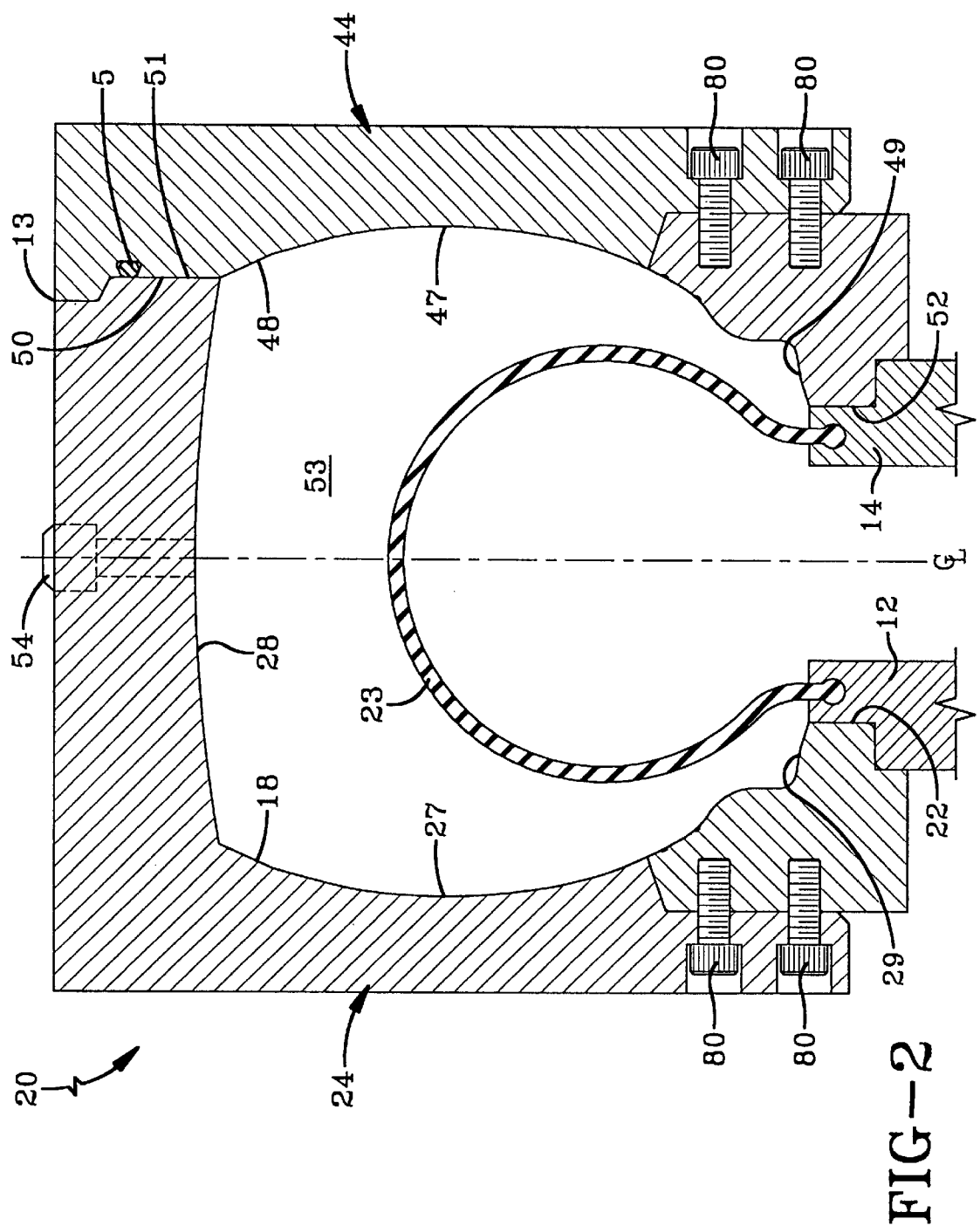
FIG. 2 is a cross-sectional view of the mold made in accordance to the invention.

This distortion will build in several stress nonuniformities that are undesirable in the tire. Ideally the tire should be built such that the tread has the same diameter as the inner surface of the mold. This would allow the tread to register perfectly in the mold and allow a tire builder to build a carcass as large as is physically possible. In order to accomplish this, the tire engineer must develop a mold that will not hit or catch the tread as the mold closes. As shown in FIG. 2, the mold 20 of the present invention has the parting line 13 moved in proximity of a lateral end of the tread. As shown in FIG. 2, the parting line 13 preferably is located precisely at the lateral edge of the tread. This insures that when the mold 20 closes it will not contact or catch the tread. In the preferred embodiment the parting ling 13 is located on the top 44 of the mold 20 at or near the lateral end support 48 for the tread 10 a shown in the FIGS. 2–4. Alternatively, the parting line 13 can be located at or near the opposite lateral tread end support 18 on the bottom half of the mold. In either case, the use of a parting line 13 at or near the treads lateral edges greatly facilitates assembly of the tread 10 and unvulcanized tire casing 10. As further illustrated in FIG. 2 the mold 20 contains an air port 54 for applying counter pressure to the tread area so that the tread does not deform during curing This air port 54 allows a vacuum to be pulled or pressure to be applied as needed to the mold 20. The mold 20 as illustrated also utilizes an O-ring 5 to seal it under the counter pressure experienced during the molding process. The primary advantage other than not disturbing the tread to casing assembly during molding is that the mold 20 of the present invention allows a precured tread to be placed in the mold and cured with a green carcass. The tread 10 can be built to the same diameter and contour as the mold 20. This allows the carcass to be built as large as physically possible.

The method of molding is further disclosed in copending application Ser. Nos. 08/642,377 and 08/642,290, both filed on May 3, 1996 and entitled "A TRUCK TIRE HAVING AN IMPROVED PRECURED TREAD FOR A TRUCK TIRE AND THE METHOD OF ASSEMBLY," the contents of both applications being incorporated herein by reference.

With reference back to FIG. 2, the mold 20 is shown having a first annular portion 24. The first annular portion 24 has a sidewall supporting member 27 and a tread supporting member 28. The sidewall supporting member 27 has a bead forming end 29 and a tread lateral end support 18. The tread supporting member 28 is integrally attached and generally oriented normal to the sidewall supporting member 27 at the location of the tread later end support 18 of the sidewall supporting member 27. The tread supporting member 28 has a smooth axially contoured annular surface for contacting the radially outer surface of the precured tread and a first end 51.

The second annular portion 44 has a sidewall supporting member 47 and tread lateral end supporting member 48. The second annular portion 44 has a first end 50 and a second end 52; the first end 50 being adjacent to tread lateral end supporting member 48, The first end 50 is aligned with the first end 51 of the first annular portion 24 and when the mold 20 is closed forms a cavity 53 for the precured tread and casing assembly. The second end 52 is at a bead forming end 49 of the second annular portion 44. Both bead forming ends 29,49 are attached to their respective first or second mold portions 24,44 by means of thread fasteners 80.

Figure 3B:
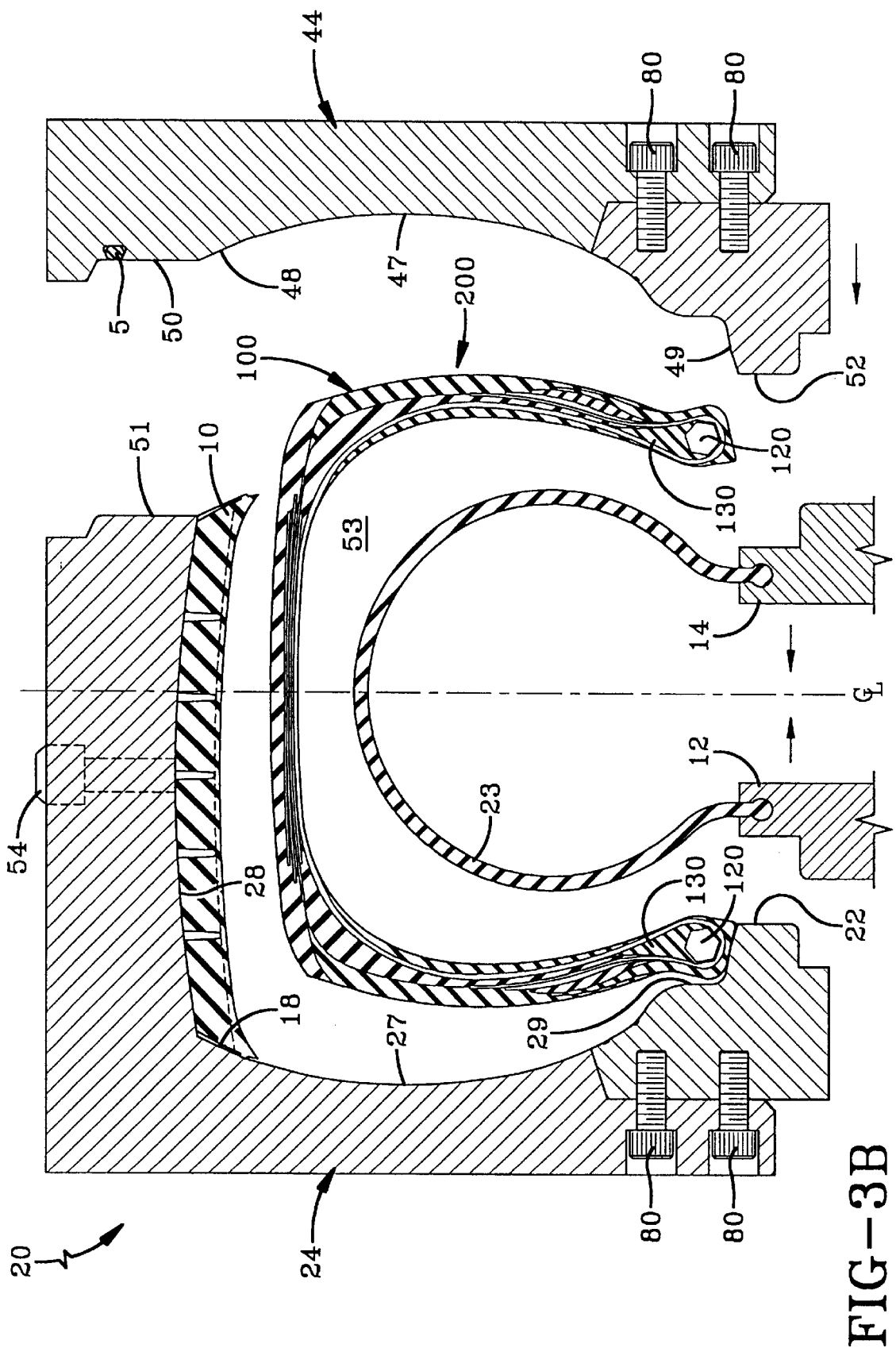
FIG. 3B shows the cross-sectional view of the mold taken from FIG. 2 further including a tire tread and casing inserted therein.

As shown in FIG. 3 a pair of annular portions 12,14 are provided. The annular forming portions 12,14 are adapted to removably engage the ends 22,52 of the first and second annular portions 24,2.

Figure 4:
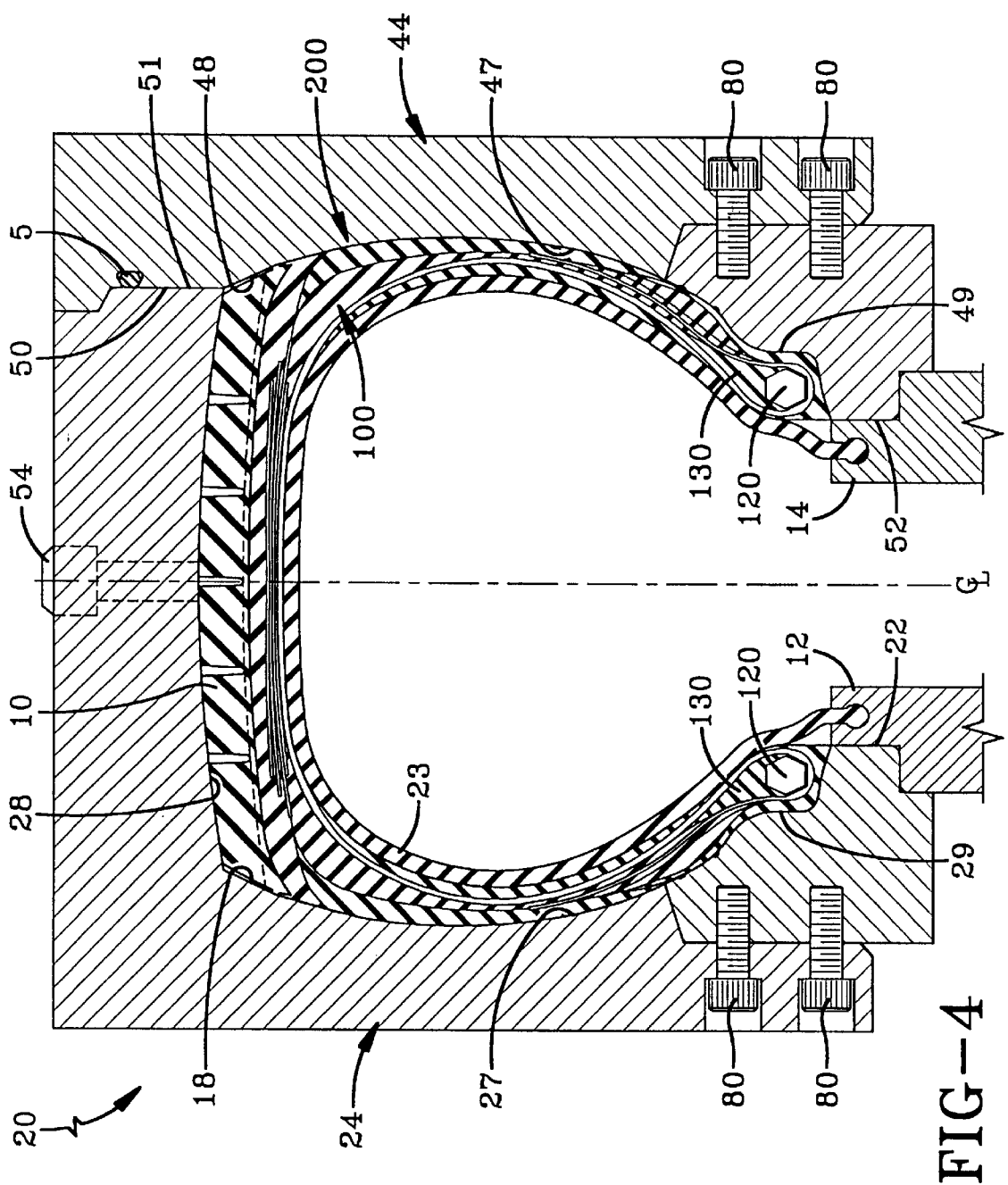
FIG. 4 is a cross-sectional view of a tread being firmly pressed into a smooth mold by the inflation of a bladder which expands the unvulcanized casing and precured tread assembly.

As shown in FIG. 4 an inflatable bladder 23 for insertion into the casing is enclosed in the cavity 53 of the closed mold 20. The inflatable bladder 23 is pressurized and helps force the casing and tread assembly against the mold surfaces.

As shown in FIG. 2 the tread supporting member 28 of the first annular 24 portion has a port 54 for venting or pressurizing void spaces between the smooth annular surface of the tread supporting member 28.

Figure 8:
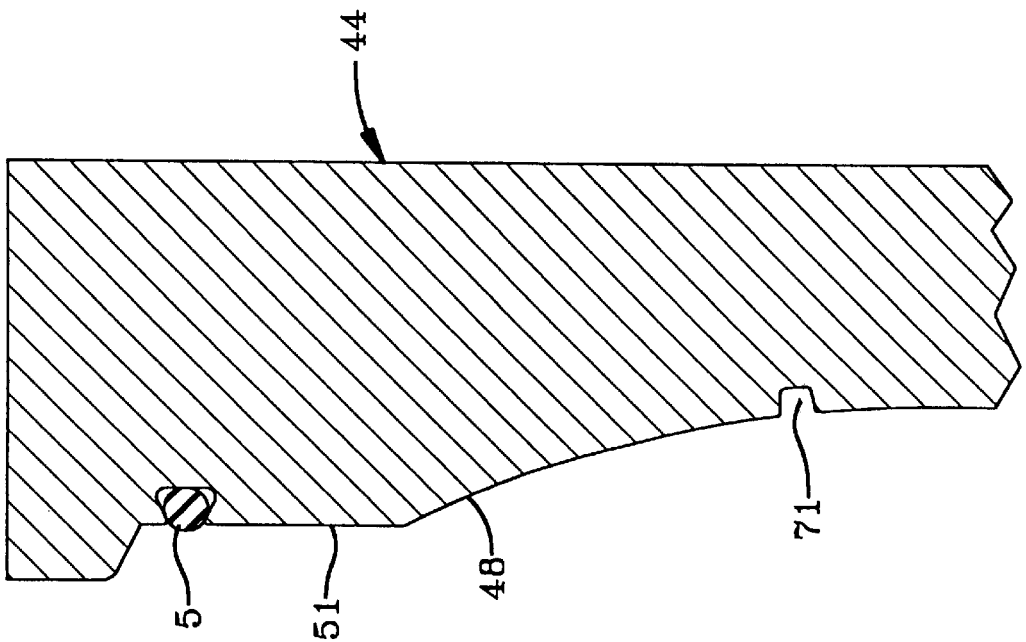
FIG. 8 is an enlarged portion of the mold at a tread lateral support location showing the use of a recess.
Figure 7:
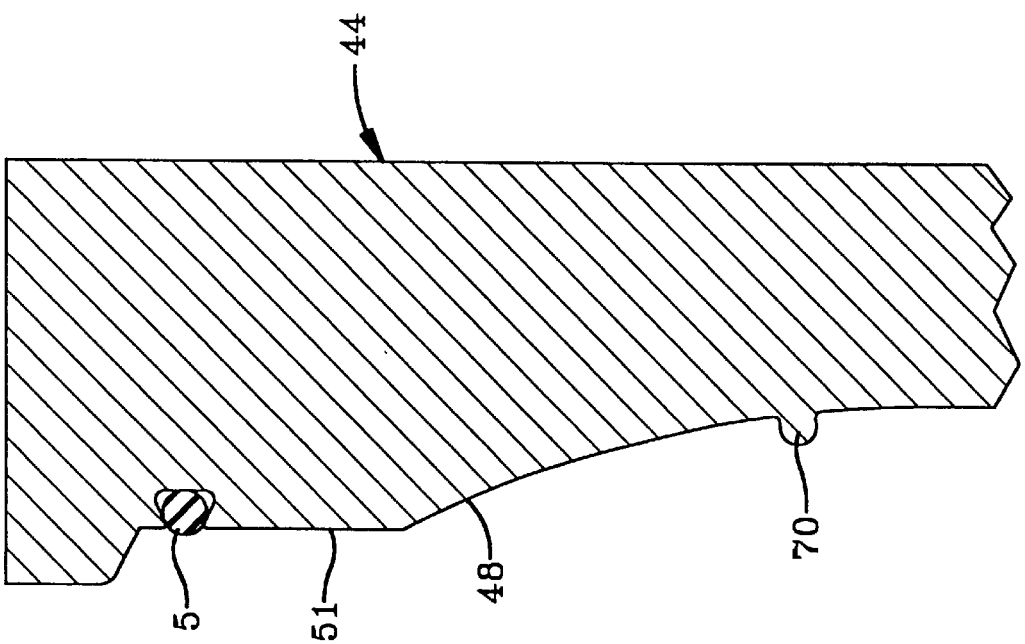
FIG. 7 is an enlarged portion of the mold at a tread lateral support location showing the use of a projection.

As shown in FIGS. 7 and 8 of the alternative embodiment each lateral end portion 18,48 of the first and second portions 24,44 includes an annular sealing projection 70 or recess 71. These projections 70 or recesses 71 further facilitate sealing the tread edge to the casing and are designed to allow the unvulcanized rubber to flow up over the tread edge providing for an improved seal at this region.

Figure 5:
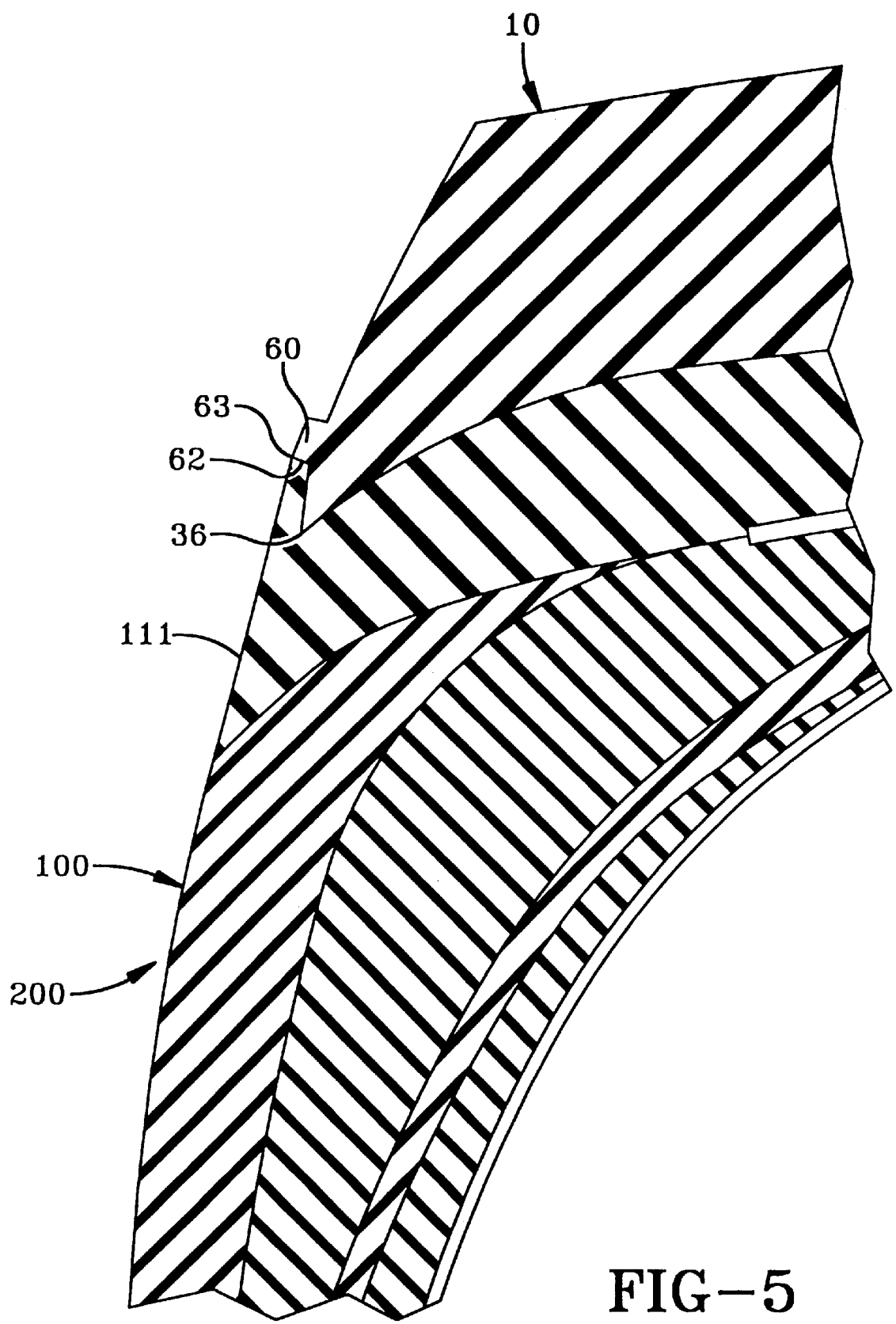
FIG. 5 is a partial cross-sectional view of the tread and casing after molding.
Figure 6:
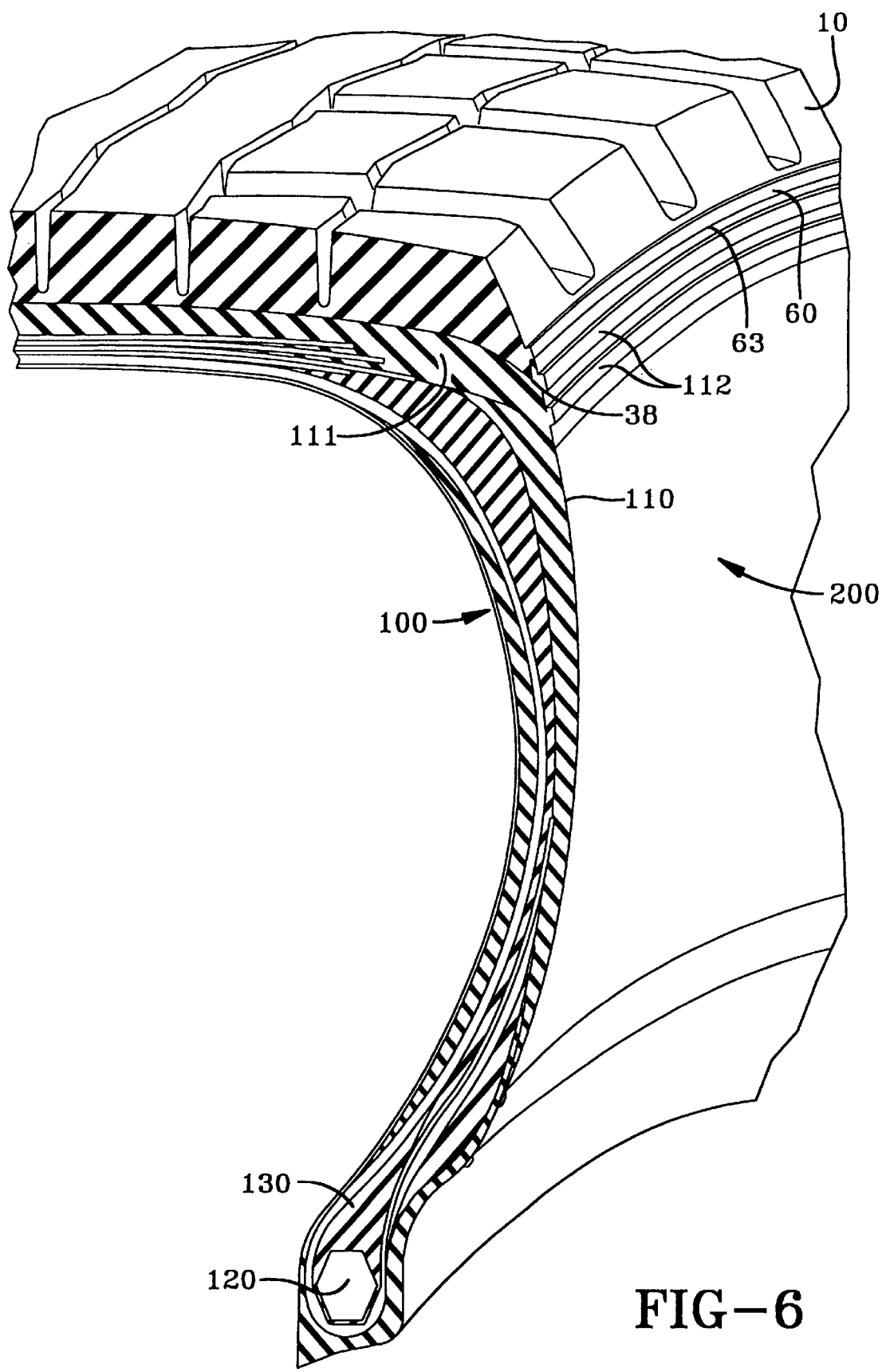
FIG. 6 is an enlarged partial perspective view of the cross section of FIG. 5 depicting the tire 200 and the tread casing 100 interface.

As shown in FIGS. 5 and 6 the tread casing assembly 200 has a surface that is molded as a result of the use of the inventive mold 20 that greatly camouflages or masks the tread 10 to casing 100 interface. The tread projection 60 allows the cushion rubber 111 to flow to the projection in the location 62 thus covering the precured tread radially inner edge 36. The use of multiple projections or recesses in the mold 20 leaves annular projections 112 further masks the tread to casing joint at location 63. As shown, the casing 100 has an annular bead core 120 and an apex 130.

As shown in the preferred embodiment of FIGS. 1–4 the lateral end portions 18,48 have a smoother contour surface that contacts the tread 10. This is as is taught in U.S. Pat. No. 5,536,348. The tread 10 preferably has an annular projection 60 that air tightly seals against the tread lateral end portions 18,48 of the mold 20. If the tread 10 has a pair continuous shoulder ribs at the lateral edges it may rely on the annular outer surface of the rib to air tightly seal the tread to the mold. Alternatively, the mold 20 may have annular recesses 71 or projections 70 at each lateral end portion 18,48 to effect the air tight seal as shown in FIGS. 7 and 8.

What is claimed is:

1. A tire and a mold for curing a precured annular tread to an unvulcanized tire casing, the tire to be cured and the mold characterized by:

the tire having a precured annular tread and an unvulcanized tire casing, the precured annular tread having a pair of lateral ends and a radially outer tread surface having a molded precured diameter and contour built to the same diameter and contour as the mold for curing the precured annular tread to the tire casing;

the mold having a first annular portion, the first annular portion having a sidewall supporting member, the sidewall supporting member having a bead forming end and a tread lateral end support, and a tread supporting member integrally attached and generally oriented normal to the sidewall supporting member at the location of the tread lateral end support of the sidewall supporting member, the tread supporting member having a smooth axially contoured annular surface having a diameter and contour being the same dimensions as the diameter and contour of the precured annular tread for contacting the radially outer tread surface of the precured tread and a first end thereby allowing the tread to register in the mold;

a second annular portion, the second annular portion having a sidewall and tread lateral end supporting member, the second annular portion having a first end and a second end, the first end being adjacent the tread lateral end supporting member, the first end being aligned with the first end of the first annular portion when the mold is closed forming a cavity for the precured tread and casing assembly and the second end being at a bead forming end of the second annular portion;

a pair of annular bead forming portions, the annular bead forming portions being adapted to removably engage the bead forming ends of the first and the second annular portions; and an inflatable bladder for insertion into the casing enclosed in the cavity of the closed mold.

2. The tire and mold of claim 1 wherein the tread supporting member has a port for venting or pressurizing void spaces between the tread and the smooth annular surface of the tread supporting member of the first annular portion.

3. The tire and mold of claim 1 wherein each lateral end portion of the first and second annular portions includes an annular sealing projection.

4. The tire and mold of claim 1 wherein each lateral end portion includes an annular recess.

* * * * *